United States Patent [19]

Ihm et al.

[11] Patent Number: 5,593,738

[45] Date of Patent: Jan. 14, 1997

[54] PROCESS FOR THE PREPARATION OF COMPOSITE SEMI-PERMEABLE MEMBRANE

[75] Inventors: Dae W. Ihm; Jeong L. Kim, both of Seoul; Kwon I. Kim, Inchon; Byeng H. Kim, Anyang, all of Rep. of Korea

[73] Assignee: Cheil Synthetics Inc., Kyungsangbuk-do, Rep. of Korea

[21] Appl. No.: 359,301

[22] Filed: Dec. 19, 1994

[30] Foreign Application Priority Data

Dec. 20, 1993 [KR] Rep. of Korea .................. 93-28546

[51] Int. Cl.$^6$ ................................................. C23C 14/02
[52] U.S. Cl. .................. 427/534; 427/209; 427/322; 427/421; 427/538; 427/569
[58] Field of Search ........................ 427/538, 569, 427/209, 322, 421, 534

[56] References Cited

U.S. PATENT DOCUMENTS

| | | | |
|---|---|---|---|
| 3,744,642 | 7/1973 | Scala et al. | 210/500 |
| 3,912,834 | 10/1975 | Imai et al. | 427/316 |
| 4,005,012 | 1/1977 | Wrasidlo | 210/23 H |
| 4,168,352 | 9/1979 | Dick et al. | 429/204 |
| 4,267,295 | 5/1981 | Gallop et al. | 526/264 |
| 4,277,344 | 7/1981 | Cadotte | 210/654 |
| 4,366,062 | 12/1982 | Kurihara et al. | 210/651 |
| 4,606,943 | 8/1986 | Rak et al. | 427/244 |
| 4,618,534 | 10/1986 | Iwama et al. | 428/316.6 |
| 4,634,531 | 1/1987 | Nakagawa et al. | 210/639 |
| 4,661,254 | 4/1987 | Zupancic et al. | 210/490 |
| 4,761,234 | 8/1988 | Uemura et al. | 210/500.38 |
| 4,783,346 | 11/1988 | Sundet | 427/244 |

*Primary Examiner*—Bernard Pianalto
*Attorney, Agent, or Firm*—Nikaido, Marmelstein, Murray & Oram LLP

[57] ABSTRACT

There is provided a process for the preparation of composite semi-permeable membrane superior in selectivity and permeability, capable of improving bonding strength between a porous support layer and a reinforcement and mechanical strength of semi-permeable membrane.

The composite semi-permeable membrane is prepared by subjecting woven fabric or non-woven fabric to corona discharge with a discharge power of approximately 10 to approximately 15 watt for a period of approximately 20 to approximately 40 seconds, spraying water over one surface of the fabric, casting porous support substance on the other surface of the fabric when a time of approximately 5 to approximately 10 seconds has elapsed after the spray, and laminating a crosslinked polyamide ultrathin film on the porous support substance, the polyamide ultrathin film being synthesized by interfacial polycondensation of a multifunctional amine solution and a multifunctional halogen solution.

4 Claims, 1 Drawing Sheet

PROCESS FOR THE PREPARATION OF COMPOSITE SEMI-PERMEABLE MEMBRANE

BACKGROUND OF THE INVENTION

1. Field of the invention

The present invention relates, in general, to a process for the preparation of semi-permeable membrane superior in selectivity and permeability and, more particularly, to corona treatment of a reinforcement for semi-permeable membrane, thereby improving bonding strength between a porous support layer and the reinforcement and mechanical strength of semi-permeable membrane.

2. Description of the Prior Art

It is known that various dissolved substances or solutes can be separated from their liquids or solvents by various useful separation process or techniques known as ultrafiltration or reverse osmosis. Especially, reverse osmosis membranes are high permeability barriers. For example, In a liquid-liquid system, reverse osmosis membranes have high permeability for water yet are impermeable to microorganisms, colloidal particles, salts and organic materials, so that these solutes or undesirable materials can be removed.

Reverse osmosis technology, which is generally applied to separation of solutes with a size of 10 Angstrom or less, is efficient for the desalination of seawater, contaminated water or saline, to obtain pure water for drink or other uses. That is, the use of this technology which has apparently gained the widest attention to date is the desalination of brackish water or seawater to provide large volumes of relatively non-salty water for industrial, agricultural, or home use.

Purification of water through reverse osmosis membrane is accomplished by applying pressure to the seawater or contaminated water to force the water through the reverse osmosis membrane, so that purified water passes through the membrane and the salt or contaminant is rejected.

With regard to the characteristics of reverse osmosis membrane, first, it should have high salt rejection coefficient. For commercial practicality, it is required salt rejection capabilities of 98% or more. In addition, the reverse membrane should also permit high fluxes at reasonable pressures in a view of economy. Several additional requirements may be imposed on the commercial applications of reverse osmosis membrane, according to the realities of such applications. Among the additional requirements, chlorine resistance is necessary for the reverse osmosis membrane to be used for, especially, tap water.

Separation technologies using separation films are virtually based on two factors: pressure and concentration. For example, precise filtration or ultrafiltration is dependent on the former factor, whereas gas separation or permeable evaporation is on the latter factor. Reverse osmosis is based on both pressure and concentration and reverse osmosis membranes, which can filter monovalent ions or salts incapable of being filtered by precise filter membrane or ultrafiltration membrane, are useful for a wide range of uses including desalination of seawater, treatment of bittern, treatment of industrial waste water, preparation of ultra deionized water for washing semiconductor device.

In order to allow for high fluxes in desalination, the optimum type of reverse osmosis membrane is extremely thin. However, extremely thin membranes lack structural integrity as they stands. In many cases, the reverse osmosis membrane is synthesized or laminated on a porous support layer reinforcement. Of cause, the porous support layer reinforcement is required to have pore sizes large enough to pass the permeated water through the porous support layer without reducing or affecting the fluxes.

However, large pores of the porous support layer reinforcement may provide the thin synthetic semi-permeable membrane with an opportunity of filling or infiltrating the pores, so that there would be potent possibility of membrane breakdown upon operation under high pressure or of membrane deformation. Accordingly, large size of the pores on the porous support layer reinforcement is not always good, since it is apt to lose the reverse osmosis capability of the thin synthetic semi-permeable membrane as just mentioned.

Reverse osmosis membranes have been prepared from a wide variety of known polymeric materials. Many of the reverse osmosis membranes posses salt rejection capabilities of 98% or more. A part of the reverse osmosis membranes cannot permit satisfactory amount of water per area of membrane, e.g. flow rate or flux, which is another important factor for commercial practicality.

Prior patents have suggested various membranes useful for reverse osmosis technology. For example, U.S. Pat. No. 4,277,344 describes a semi-permeable membrane prepared from a crosslinked aromatic polyamine which is a product of interfacial polymerization between monomeric polyacyl halide and monomeric arylene polyamine.

U.S. Pat. No. 4,415,445 discloses a membrane useful for desalination of water prepared from a copolymer consisting of a monomer containing hydroxyl group, such as methacrylic acid and hydroxyethyl methacrylic acid, and optionally additional multifunctional carboxylic acid, such as 1,2,4,5-bezenetetracarboxylic acid or citric acid.

U.S. Pat. No. 4,168,352 teaches a process for producing a membrane useful for reverse osmosis, using a monomer of hydroxyethylmethacrylate and another polymer, such as polyacrylic acid, closely mixed together. In this patent, polymerization of hydroxyethylmethacylate is conducted in a photochemical manner, and the resulting membrane comprises a homopolymer of hydroxyethylmethacrylate mixed with different polymers. There is no chemical bond between the polymerized hydroxyethylmethacrylate and polycarboxylic acid.

U.S. Pat. No. 4,267,295 describes hydrogel which is prepared by crosslinking acrylates, such as glycerlymethacrylate, methylmethacrylate and hydroxyethylacrylate, with diacrylate, such as ethyleneglycoldimethacrylate. Polymerization for the hydrogel is initiated by a free radical initiator, such as azobisisobutyronitrile. The resulting film has free hydroxyl groups which are unreacted during formation of the film and is composed of crosslinked, heterogeneous polymer of various monomers.

In addition, there are many patents that are concerned with composite semi-permeable membranes using various materials. Among the patents are U.S. Pat. Nos. 3,744,642, 4,005,012, 4,366,062, 4,606,943, 4,618,534, 4,634,531, 4,661,254, 4,761,234, and 4,783,346.

To date, interfacially synthesized reverse osmosis membranes which are described in U.S. Pat. No. 4,277,344 have generally been adopted, in consideration of general aspects of membrane capability.

As previously mentioned, the porous support layer for composite semi-permeable membrane must have mechanical strength and toughness sufficient to endure under high pressures as well as pore sizes large enough not to be resistant to water flow. In addition, it should satisfy a requirement that a porous support layer solution is not transuded from one surface of the reinforcement when it is cast on the other surface thereof. For example, if the porous support layer solution infiltrates into and is transuded to the opposite surface of reinforcement, the membrane is adversely affected in an aspect of the flux, although not in selective permeability. This ill influence gives rise to increasing difficulty in operating process steps, continuously and thus, in large scale.

In an effort to solve the above problems, U.S. Pat. No. 3,912,834 intended to improve the mechanical strength and flux of semi-permeable membrane, along with a production process therefor. In this process, the degree of infiltration of a support layer substance into a support layer reinforcement is controlled by soaking a back side of a porous fabric, the support layer reinforcement, in a solvent incompatible with the support layer substance and casting the support layer substance on a front side of the porous fabric. However, this prior technology neither is operated continuously nor exhibits satisfactory flux.

SUMMARY OF THE INVENTION

Therefore, an object of the present invention is to overcome the above problems encountered in prior arts and to provide a process for the preparation of composite semi-permeable membrane superior in selectivity and permeability, capable of improving bonding strength between a porous support layer and a reinforcement and mechanical strength of semi-permeable membrane.

Based on the intensive and through research and study by the present inventors, the above object of the present invention could be accomplished by a provision of a process for the preparation of composite semi-permeable membrane, characterized by comprising the steps of treating the support layer reinforcement with corona discharge, to cause a change in chemical properties of the reinforcement through introduction of polar functional group thereon and infiltrating a solvent incompatible with the porous support layer substance into the reinforcement to some degrees.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE INVENTION

Treatment of polymeric material with corona discharge not only modifies the physical structure of the polymeric material but also changes the chemical properties thereof. A weak layer on the polymeric material is taken off by thermal effect of corona, which results in change in the surface structure thereof. In addition, corona discharge has chemical influence on the polymeric material through introduction of polar functional groups on the surface of the polymer.

The present inventors found that such corona discharge treatment can be utilized to form a porous support layer reinforcement for composite semi-permeable membrane with the aim of improvement in the flux.

In accordance with the present invention, a composite semi-permeable membrane is prepared by subjecting woven fabric or non-woven fabric as reinforcement to corona discharge with a discharge power of approximately 10 to approximately 15 watt for a period of approximately 20 to approximately 40 seconds, spraying water over one surface of the fabric, casting porous support substance on the other surface of the fabric when a time of approximately 5 to approximately 10 seconds has elapsed after the spray, and laminating a crosslinked polyamide ultrathin film on the porous support substance, said polyamide ultrathin film being synthesized by interfacial polycondensation of a multifunctional amine solution and a multifunctional halogen solution.

The application of the preferred embodiments of the present invention will be best understood with reference to the accompanying drawings.

Figure 1:
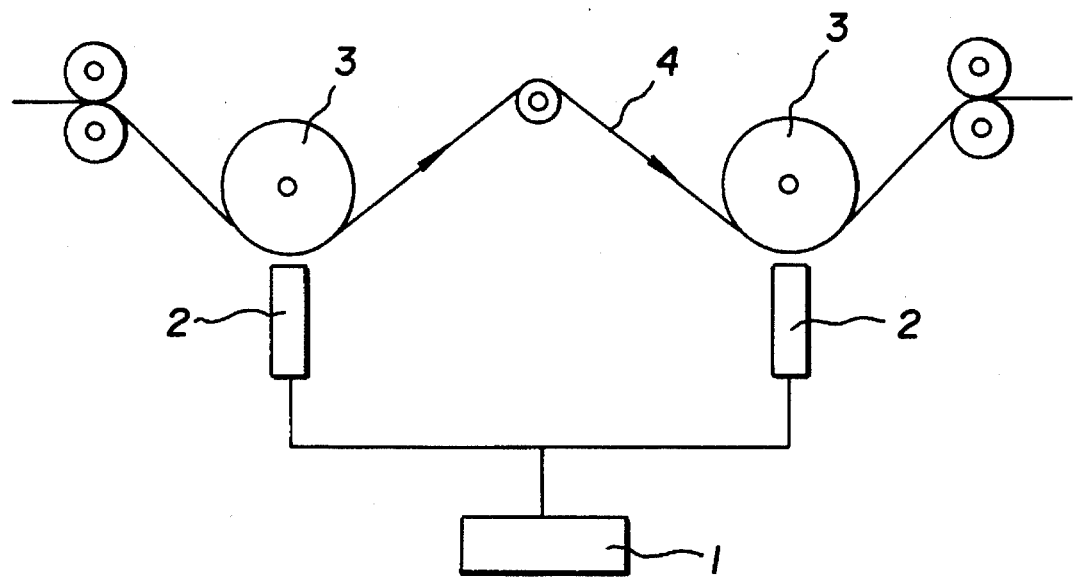
FIG. 1 is a schematic view showing a corona discharge system according to the present invention.

Referring initially to FIG. 1, there is shown a corona discharge system useful to prepare a reinforcement of a composite semi-permeable membrane according to the present invention. As shown in this figure, a high frequency power system 1 provides an electric field to two electrodes 2 which each is paired with a dielectric roller 3, to subject a sample 4 passing therebetween to corona treatment. Polar functional groups are introduced to the surface of the sample (woven fabric or non-woven fabric) by the corona treatment.

The corona discharge system used in the present invention is of vacuum tube type. In the corona discharge system, the dielectric roller 3 is coated with silicon rubber superior in thermal resistance and heat amount. In consideration of flux, mechanical strength of membrane and salt rejection coefficient, it is preferred that the corona discharge is operated with a power of approximately 10 to approximately 15 watt for a treatment period of approximately 20 to approximately 40 seconds.

Figure 2:
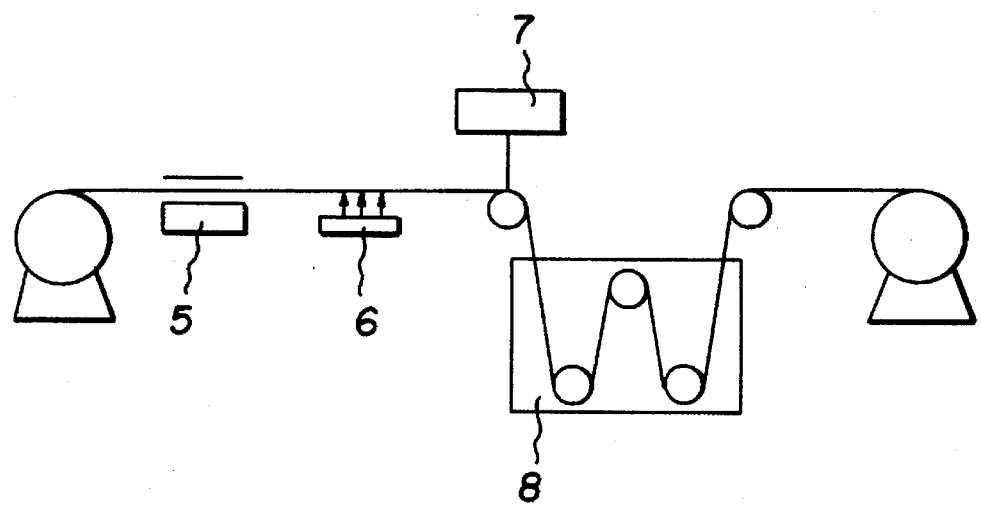
FIG. 2 is a schematic view showing a process for preparing a non-woven reinforced porous support, according to the present invention.

Referring now to FIG. 2, there is illustrated a process for preparing a non-woven reinforced porous support according to the present invention. As shown in this figure, a surface of sample is subjected to corona discharge by a corona treatment system 5 and then incorporated with water by a water sprayer 6. After the sample is transferred along the line for a predetermined time, preferably 5 to 10 seconds, a support layer solution is cast on the face of sample using a film-forming equipment 7, and the sample is immersed in a water bath 8, to obtain a non-woven reinforced porous substrate. A crosslinked polyamide ultrathin film is laminated on above non-woven reinforced porous substrate.

In the present invention, as a reinforcement for the porous support layer, there is employed polyester non-woven fabric which is approximately 100 to approximately 200 μm thick and has a weight of approximately 50 to approximately 300 g per square meter.

It is recognized that the discharge power and discharge treatment time upon the corona discharge, and the interval between the incorporation of water and the casting of support layer solution are important for desired non-woven reinforced porous substrate. If the conditions depart the ranges suggested, the composite semi-permeable membrane cannot exhibit good physical properties, such as flux, mechanical strength and salt rejection coefficient.

For measurement of salt rejection percentage and flux, the prepared composite semi-permeable membrane according to the present invention was tested under the condition that saline (NaCl) water of 500 ppm was provided at 25° C. and at a pressure of 8 kg/cm². A microscopic observation of the cross section of the prepared composite semi-permeable membrane was conducted to detect the degree of infiltration of the support layer solution. The salt rejection percentage is represented by the following formula:

$$\text{Salt rejection percentage (\%)} = \frac{C - C'}{C} \times 100$$

wherein,

C is a NaCl concentration of the feed solution; and

C' is a NaCl concentration of the permeate.

As a result of the test, it was confirmed that the composite semi-permeable membrane prepared according to the method of the present invention brought significant improvement into flux and mechanical strength without decreasing salt rejection coefficient, relative to prior art ones.

The preferred embodiments of the present invention will now be further described with reference to specific examples.

EXAMPLE 1

Polyester non-woven fabric which was 150 μm thick and 8 cm wide was subjected to corona treatment with a discharge power of 13 watt for 30 seconds. Water was uniformly sprayed on the treated face of the polyester non-woven fabric. After 5 seconds, a 15 weight % solution of polysulfone resin in dimethyl formamide was cast on the other face, opposite to the face incorporating water, in a thickness of approximately 100 μm, and the polyester non-woven fabric was immediately immersed in a water bath containing water of 30° C., to solidify the solution cast. The non-woven reinforced polysulfone porous substrate thus obtained was immersed in water of ordinary temperatures for 24 hours, to completely substitute water for the solution present in the pores of the substrate. Thereafter, the resulting non-woven reinforced polysulfone porous substrate was immersed in a solution of 4 weight % m-phenylenediamine in water for 20 hours, coated with in a solution of 1.0 weight % trimesoly chloride in n-hexane for 5 minutes on polysulfone layer and dried at ordinary temperatures.

The composite membrane thus prepared was measured for its salt rejection percentage and flux and the results of the measurement are given as shown in the following Table 1.

Microscopic observation of a cross section of the composite membrane confirmed that the support layer solution did not transude from the polyester non-woven fabric, reinforcement. In addition, the support was believed to exhibit superior adhesiveness with the polyester non-woven fabric from the microscopic observation, due to uniform infiltration of the porous support material into the non-woven fabric.

COMPARATIVE EXAMPLE 1

A polyester non-woven reinforced composite membrane was prepared in a similar manner to that of Example 1, except that polyester non-woven fabric was treated with corona discharge for 10 seconds.

The polyester non-woven reinforced composite membrane was evaluated for membrane characteristics and the results of the evaluation are given as shown in the following Table 1.

Microscopic observation of a cross section of the composite membrane told that the support layer solution was transuded to the opposite surface of polyester non-woven fabric, reinforcement for the support.

COMPARATIVE EXAMPLE 2

A polyester non-woven reinforced composite membrane was prepared in a similar manner to that of Example 1, except that support layer solution was cast on a surface of the polyester non-woven fabric treated with corona discharge when 20 seconds elapsed after the spray of water on the other surface thereof.

The polyester non-woven reinforced composite membrane was evaluated for membrane characteristics and the results of the evaluation are given as shown in the following Table 1.

Microscopic observation of a cross section of the composite membrane told that the support layer solution was transuded the opposite surface of polyester non-woven fabric, reinforcement for the support.

COMPARATIVE EXAMPLE 3

A polyester non-woven reinforced composite membrane was prepared in a similar manner to that of Example 1, except that corona discharge was not conducted.

The polyester non-woven reinforced composite membrane was evaluated for membrane characteristics and the results of the evaluation are given as shown in the following Table 1.

COMPARATIVE EXAMPLE 4

A polyester non-woven reinforced composite membrane was prepared in a similar manner to that of Example 1, except that polyester non-woven fabric was not treated with corona discharge and not incorporated with water, and a 20 weight % solution of polysulfone resin in dimethyl formamide as support layer solution was cast on the polyester non-woven fabric.

The polyester non-woven reinforced composite membrane was evaluated for membrane characteristics and the results of the evaluation are given as shown in the following Table 1.

Microscopic observation of a cross section of the composite membrane told that the support layer solution did little infiltrate into the non-woven fabric, showing low the adhesiveness.

TABLE 1

| Example No. | Salt rejection (%) | Flux (l/m² · day) |
| --- | --- | --- |
| 1 | 98.3 | 295 |
| C-1 | 98.2 | 269 |
| C-2 | 98.3 | 272 |
| C-3 | 98.4 | 275 |
| C-4 | 98.2 | 253 |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A process for the preparation of composite semipermeable membrane wherein a porous support layer is cast on polyester non-woven fabric and covered with an active layer of polyamide ultrathin film that is obtained by interfacial polycondensation of multifunctional amine solution with multifunctional halogen solution, comprising the steps of:

subjecting a surface of a polyester non-woven fabric to corona discharge;

spraying water on the corona-treated surface of the polyester non-woven fabric; and casting a porous support substance on an other surface of the polyester non-woven fabric.

2. A process in accordance with claim 1, wherein the casting step is undertaken when a time of approximately 5 to approximately 10 seconds has elapsed after the spraying step.

3. A process in accordance with claim 1, wherein the corona discharge is conducted with a discharge power of approximately 10 to approximately 15 watt.

4. A process in accordance with claim 1, wherein the corona discharge is conducted for a period of approximately 20 to approximately 40 seconds.

* * * * *